United States Patent [19]
Westerlund et al.

[11] 3,967,837
[45] July 6, 1976

[54] HIGH PRESSURE COUPLING APPARATUS

[75] Inventors: Robert E. Westerlund, Mequon; Herbert A. Westerlund, Port Washington, both of Wis.

[73] Assignee: Construction Forms, Inc., Cedarburg, Wis.

[22] Filed: Nov. 4, 1974

[21] Appl. No.: 520,548

[52] U.S. Cl. .................................. 285/112; 285/365
[51] Int. Cl.² ......................................... F16L 17/00
[58] Field of Search ........... 285/112, 365, 366, 367, 285/407, 408, 409, 410, 411, 373, 419, 111

[56] References Cited
UNITED STATES PATENTS

| | | | |
|---|---|---|---|
| 2,028,182 | 1/1936 | Barnickol | 285/112 |
| 3,291,506 | 12/1966 | Blakeley | 285/112 |
| 3,351,352 | 11/1967 | Blakeley et al. | 285/112 X |
| 3,680,894 | 8/1972 | Young | 285/112 |
| 3,705,737 | 12/1972 | Westerlund et al. | 285/365 |

FOREIGN PATENTS OR APPLICATIONS

| | | | |
|---|---|---|---|
| 1,346,620 | 11/1963 | France | 285/367 |
| 866,626 | 4/1961 | United Kingdom | 285/112 |

*Primary Examiner*—Dave W. Arola
*Attorney, Agent, or Firm*—Andrus, Sceales, Starke & Sawall

[57] ABSTRACT

Concrete pumping conduits are connected by releasable hinged couplers. The ends of the conduits include metal pipes formed with annular grooves including a circular peripheral base and a stepped end wall immediate adjacent the end of the pipe to define a pair of generally parallel and radially extended, inclined sidewalls. The coupler is formed with inwardly projecting legs with the inner walls similarly stepped and defining a pair of generally inclined radial sidewalls offset in accordance with the offset of the grooved siewalls, but slightly less than such spacing. A sealing gasket is located within the base of the cup-shaped recess with a tongue-like ridge projecting between the two end faces of the pipe ends. The first radially outermost sidewalls of the coupler and the radially innermost sidewalls of the groove engage upon closing to provide a mechanical connection. The gasket is collapsed to seal the joints. The inner secondary, coupling sidewalls of the coupler and pipe grooves are spaced slightly from each other in the closed position. If the first sealing walls breakdown or roll over, the secondary sidewalls move into engagement resulting in a continued operable coupling. The gasket is recessed adjacent the ridge to define adjacent chambers with the outer sidewalls to define lips in sealing engagement with the conduit. The peripheral ends of the pipes are chamfered and engaged by the sealing lips.

10 Claims, 5 Drawing Figures

HIGH PRESSURE COUPLING APPARATUS

BACKGROUND OF THE INVENTION

The present invention relates to a high pressure coupling apparatus and particularly to a releasable coupling of a pair of pipe sections located in axially end-to-end relationship.

High pressure flow systems may employ suitable conduits which are releasably interconnected for relatively short periods of time. A particular example which has recently been developed is in pumping of concrete on site. In such systems, the concrete may be trucked or otherwise delivered to the installation site and then transferred to the actual drop location through a pressurized pumping system. Each installation is generally unique to the particular installation. In practice, the required system is made from a plurality of standardized pipe sections which are releasably interconnected through a quick coupler for subsequent assembly. For example, U.S. Pat. No. 3,705,737, which issued Dec. 12, 1972 to Robert E. Westerlund et al., discloses a releasable hinged coupler for interconnecting of the adjacent end of a concrete pumping conduit and the like. In accordance with more or less conventional practice, the encircling coupler halves or sections are formed with a generally U-shaped cross-section defining outer depending leg portions which project into corresponding annular grooves formed in the adjacent pipe ends. A sealing gasket is located within the U-shaped sections banding the joint between the pipe sections to further seal the joint. The gasket is employed to create a minimum gap or volume while maintaining an essentially complete fluid type enclosure. This is significant to minimize possible material loss and long life in the connection. The coupler employs an over-center toggle latch to permit tight closure of the coupler onto the pipe ends. Although such couplers have found wide acceptance in the industry, a continuing problem exists in the field with respect to the life of the structures. Thus the continued reuse with the assembly and disassembly of the pipe section tends to result in a disruption of the sealing surfaces such as a rolling of the adjacent edges. This may result in a slight offset of the coupling with a weakened juncture. Under high pressure pumping, particularly with very long lines where high pressure surges are encountered, disruption of the joint may actually occur with a consequent resulting loss of material and, more important, significant down time of the total system while the joint is repaired. Thus, very special care is normally taken in checking the coupler and pipe ends to maintain reliable pumping continued operation. However, such systems are inherently dependent upon the reliability and skill of the workmen.

SUMMARY OF THE PRESENT INVENTION

The present invention is particularly directed to an improved pipe coupling apparatus providing a multiple interengaging sealing edge construction to permit high pressure pumping with an extended life and particularly adapted to concrete pumping installations and the like. Generally, in accordance with the present invention, the pipe end grooves and coupler unit are formed with a plurality of adjacent and axially offset stepped wall means with one pair of corresponding walls establishing a first sealed joint. Collapse of the sealed joint merely provides for the engagement of an adjacent pair of sealing walls. Applicant has found that the multiple wall construction with the cascading joint provides a highly improved results and significantly increases the life of the coupling with repeated connection assembly and disassembly.

More particularly, in accordance with the present invention as applied to concrete piping and the like, the pipe ends are formed with the annular grooves including a base and a first end step immediately adjacent thereto to define a pair of generally parallel and radially extended sidewalls each terminating in an annular clamping edge. The coupler is similarly formed with an inwardly projecting clamping wall with the end similarly stepped and defining a pair of generally inclined radial sidewalls offset in accordance with the offset of the grooved sidewalls but slightly less than such spacing. A sealing gasket is located within the base of the cup-shaped recess of the coupler with a tongue-like projectin projection between the two end faces of the pipe ends. Upon closure of the coupler the outermost sidewall of the coupler leg engages the radially innermost clamping sidewall of the pipe end groove with a metal-to-metal seal between the sidewalls and particularly the upper edge portions thereof and with suitable compression of the gasket. The inner secondary, clamping sidewalls of the coupler and the outer clamping sidewalls of the pipe grooves are spaced slightly from each other in the closed position. The close spacing, however, results in engagement therebetween if the first clamping edge should breakdown or roll over. Applicants have found that even though there may be a disruption in the first clamping edge or the like, the interengagement of the second clamping edge or surface or surface results in a holding of the coupling in a firm mechanical support arrangement to maintain and extend the life of the coupler.

The present invention thus provides a very simple and reliable means of significantly extending the life of the releasable metal coupling employed in concrete pipe pumping systems and the like.

In accordance with a further aspect of the invention, the sealing gasket includes an annular body having a central, internal, annular projection adapted to project inwardly between the two adjacent pipe sections. The inner surface of the ring member immediately adjacent such projection is grooved to define an annular chamber in the unstressed state of the gasket. The axially outer end sidewalls of the grooves are relieved slightly to locate the outer edge of the groove inwardly of the base connection to define very slight projections or lips in sealing engagement with the conduit with a relatively large sealing volume immediately adjacent thereto. The ends of the pipe section are also inclined slightly such that the lip edge is aligned therewith. Applicants have found that this provides a very highly improved and practical sealing gasket which minimizes the cavity at the joint while maintaining a high pressure seal. It is particularly advantageous in concrete pumping and the like where the seal does not have to be absolutely fluid tight but should significantly minimize any material loss while maintaining the very high pressure seal against surge pressures and the like.

The present invention has been found to provide a highly improved releasable pipe coupling particularly adapted for concrete placement insulation and the like where it is desired to or where the rapid, frequent connection or assembly and disassembly of pipe sections is required.

BRIEF DESCRIPTION OF THE DRAWING

The drawing furnished herewith illustrates a preferred construction of the present invention disclosing the best mode in carrying out the present invention and in which the above advantages and features are clearly disclosed as well as others which will be readily understood from the following description.

In the drawing.

DESCRIPTION OF THE ILLUSTRATED EMBODIMENT

Figure 1:
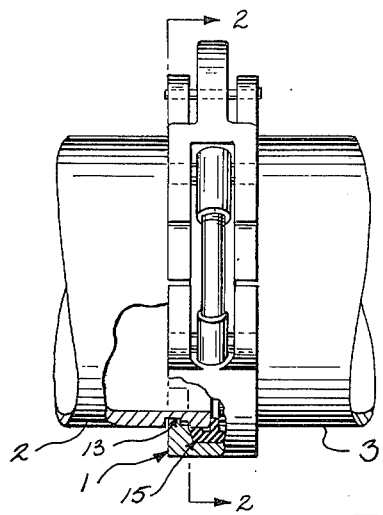
FIG. 1 is an elevational view of a coupling interconnecting a pair of concrete conduit members constructed in accordance with portions broken away and sectioned to illustrate details of the present invention.
Figure 2:
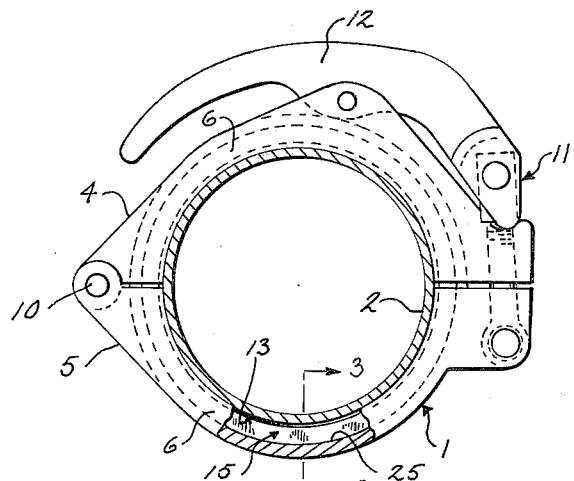
FIG. 2 is a vertical section taken generally on line 2—2 of FIG. 1 and illustrating the coupler shown in FIG. 1.

Referring to the drawing and particularly to FIGS. 1 and 2, a coupling unit 1 is shown releasably interconnecting a pair of metal conduits or pipes 2 and 3 in end-to-end relation to establish a continuous flow path therebetween. The illustrated coupling unit 1 includes a pair of similar semi-circular sections or members 4 and 5, the opposite end faces of which are generally radially plane surfaces such that with the coupling in the closed position, shown in FIGS. 1 and 2, an essentially complete circular enclosure is provided about the adjacent end pipes 2 and 3. The semi-circular coupling sections 4 and 5 are formed with similar cross-sections and, in particular, as shown in FIG. 1 are generally of a U-shaped construction defining a pair of laterally spaced legs or lips 6 and 7, the inner edges of which are located within radially clamping grooves 8 and 9 formed on the exterior surfaces of the pipes 2 and 3 adjacent the ends. The illustrated coupling unit 1 is generally similar to that disclosed in the previously identified U.S. Pat. No. 3,705,737. The semi-circular coupling sections 4 or 5 are interconnected at one end by hinge pin 10 and at the opposite end by a releasable toggle latch 11 including a manually operable handle 12 which permits the release and opening of the coupling unit 1 with respect to the pipes 2 and 3 for assembly and disassembly of the pipe sections. The present invention is particularly directed to the construction and arrangement of the interconnection between the coupling legs 6 and 7 and the grooves 8 and 9 to form a liquid-tight and physically firm connection and, in the illustrated embodiment, includes the similar stepped connecting surfaces 13 and 14 as more fully developed hereinafter. In addition a unique circular sealing gasket 15 is located within the U-shaped cavities of the couplers in overlying relationship to the ends of pipes 2 and 3 to establish an improved liquid-type joint.

Thus with the coupling unit 1 in the closed position, as shown in FIGS. 1 and 2, the physical interengagement of the coupling members 4 and 5 with the pipe ends 2 and 3 at the stepped connections 13 and 14 create a firm physical interengagement therebetween to maintain the aligned location of the pipe sections 2 and 3 relative to each other and the gasket 15 provides a liquid-tight joint.

As the particular construction of the hinge construction and toggle assembly of the coupling unit may be of any desired construction, no further detailed description thereof is given. As noted, the present invention is particularly directed to the improved construction of the coupling and sealing between the coupler 1 and pipes 2 and 3 and a preferred construction is shown in the drawing and described as follows.

The invention, as previously noted, is particularly advantageously applied to a concrete placement system where steel end couplings or pipes are employed. Pipes 2 and 3 may be elongated sections or may be special end members secured to a flexible conduit. More particularly, in accordance with the illustrated embodiment of the invention, each of the coupling surface means 13 and 14 is similarly constructed and the means 13, shown to the left in FIG. 3, is described in detail with the corresponding elements of the other coupling surface means identified by similar primed numbers for simplicity and clarity of explanation.

Figure 3:
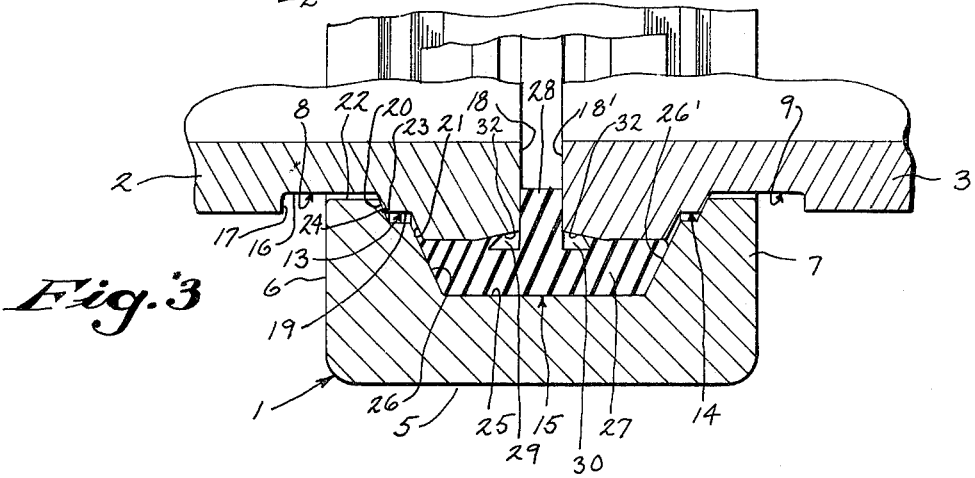
FIG. 3 is an enlarged fragmentary vertical section taken generally on line 3—3 of FIG. 2.

Referring particularly to FIG. 3, the pipe end groove 8 is formed with an elongated longitudinal base 16, with the longitudinally outermost sidewall 17 spaced from the coupler 1 to permit ready introduction of the coupling leg 6. The coupling means 13 has the opposite grooved end spaced inwardly from the end face 18 of pipe 2 and is formed as a stepped end sidewall including the base wall 16 of the groove 8 and an intermediate level or wall 19 generally, centrally of the depth thereof and in the principal outer, tubular plane of pipe 2. The intermediate wall 19 is connected to the base wall 16 by a generally, radially extended wall 20 which is inclined slightly in the longitudinal or axial direction from the base wall 16 toward the pipe end 18. The outermost end of the pipe section is enlarged to define a further similarly inclined wall 21 extending from the intermediate wall 19 to the outer periphery of the end of the pipe 2. The pipe end can be formed in any suitable manner with the groove. For example, the pipe end can be formed with the groove 8 and the enlarged end formed by rolling of the pipe body.

The adjacent side leg 6 of the coupling 1 is similarly shaped with an inner flat or planar radially outer face 22 connected to an inner intermediately located wall 23 by an inclined sidewall 24 generally extending parallel with the first sidewall 20 of the groove 8. The intermediate ledge or wall 23 of the leg 6 is coupled to the base 25 of the cup-shaped cavity by a further inclined sidewall 26.

The coupler cavity defined by legs 6 and 7 is generally a frustroconically shaped cavity with the base 25 of a width slightly less than the spacing of the secondary clamping walls 21 and 21' of the grooves 8 and 9.

Figure 4:
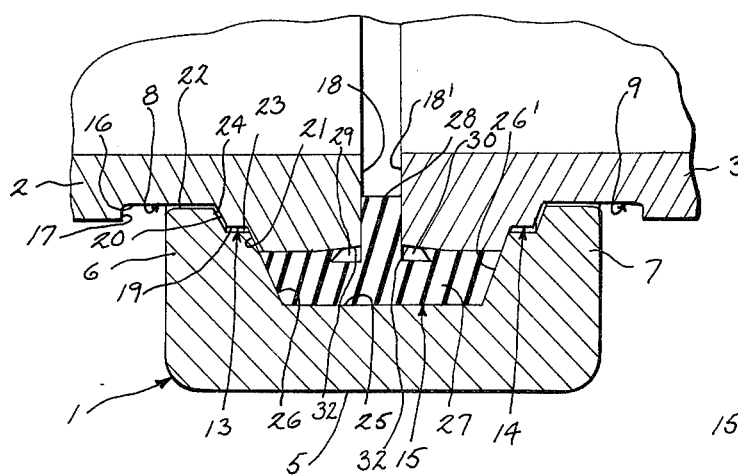
FIG. 4 is a view similar to FIG. 3 illustrating the alternate or secondary sealing condition of the coupling.
Figure 5:
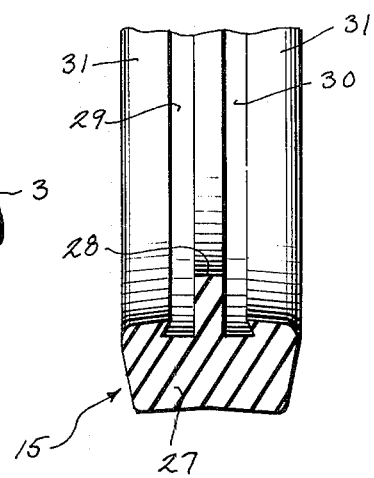
FIG. 5 is a fragmentary view of the coupling gasket shown in FIGS. 1-4.

The gasket 15 is located within the cavity encircling the end sections 2 and 3 and particularly the enlarged end portions thereof. Gasket 15 is a resilient, rubberlike member having a T-shaped cross-section with a ring-like solid portion 27 and a centrally located projection of rectangular cross-section wholly or partially extended between opposed end faces 18 and 18' of sections 2 and 3. The outer sidewalls of the gasket 15 are slightly inclined and the base is generally flat to conform to the shape of the cavity and particularly walls 26 and 26'. Further, the inner ring surfaces immediately adjacent to the projection 28 are recessed as at 29 and 30 to define a slight chamber immediately adjacent to the projection. The axially outer walls of the recesses 29 and 30 are similarly formed relieved slightly with the walls inclined slightly to form a small, feathered type lip engaging the pipe section, as most clearly shown in FIGS. 3 and 5. When the gasket 15 is applied to the end pipe sections 2 and 3, the gasket is deformed to locate the sealing lip in firm engagement with chamfered portion 32 of the pipe section, as shown in FIGS. 3 and 4, and to further reduce somewhat the slight chamber formed by the small recesses. Applicants have found that the small recesses in combination with the small lip produce a reliable seal which minimizes the build-up of material within the gasket. Thus, any fluid medium which escapes through the gap into the annular chambers 29 or 30 creates a pressure engagement between the lip and the adjacent chamfered portion 32 of the pipe section. Applicant has found that the open annular recess 29 or 30 with the slightly relieved sidewall provides a highly efficient seal while permitting convenient assembly and disassembly of the gasket with respect to the end pipes.

In operation, when the coupler 1 is closed onto the pipe end sections 2 and 3, the first radial clamping walls 24 and 24' of the side legs 6 and 7 engage the inner longitudinally spaced clamping walls 20 and 20' of the grooves 8 and 9. The intermediate ledge 19 and 19' of the grooves 8 and 9 is of a slightly longer longitudinal extent than the intermediate ledge or wall 23 and 23' of the clamping legs 6 and 7 such that the secondary clamping walls 21 and 21' are spaced from each wall 26 and 26' as shown in FIG. 3. This thus, establishes a first positive mechanical connection to locate and support the pipe sections 2 and 3 relative to each other, with the gasket tightly clamped in position to establish a generally liquid-tight joint.

The coupling unit 1 and pipe sections 2 and 3 may be assembled and disassembled many times with the seal established as in FIG. 3. With time, however, the sealing walls and particularly the edge portions between the inclined sidewall and the intermediate ledge have a tendency to be disrupted either through the use encountered and/or as a result of the connection and disconnection of the coupling. As a result, one or both of the first coupling walls may be destroyed partially or wholly allowing the pipe sections to move from axial alignment and creating a weak connection. When a high pumping pressure is created the junction may fail. Applicants have found that with the present invention, any disruption which would tend to destroy the effectiveness of the mechanical connection merely results in the secondary clamping wall or walls 26 and 26' of the coupling legs 6 and 7 moving into engagement with the second clamping walls 21 and 21' of the grooves 8 and 9 to maintain firm mechanical interengagement, such as shown in FIG. 4.

Thus, the present invention provides unique, successive or cascaded coupling walls which continue the physical connection between the pipe sections and significantly increase the reliable operating life of the coupling sections. The required modification of the coupler end provides a convenient and economical production type construction such that it can be readily applied to concrete conduits and the like. The particular number of stepped portions and the like and the method of forming thereof can, of course, be formed in any desired manner within the broad concept of the present invention. The single step construction has been found to provide very reliable and long life units in concrete pumping applications.

Various modes of carrying out the invention are contemplated as being within the scope of the following claims, particularly pointing out and distinctly claiming the subject matter which is regarded as the invention.

We claim:

1. In combination, a pair of conduit members located in end-to-end coaxial alignment, each of said conduit members including annular circumferential grooves spaced axially inwardly from the aligned ends and having end sidewalls spaced axially inwardly from said ends, an encircling coupling unit encircling the ends of the conduit members and having means to tighten the coupling unit about the conduit members, said coupling unit including laterally spaced side legs projecting generally radially one each into each of said grooves, said coupling legs each having an inner wall adjacent the sidewall of the corresponding groove, said adjacent sidewall and inner wall being formed to define a first pair of clamping walls adapted to move into engagement upon closure of the clamp unit with the legs spaced from the base of the grooves to tightly clamp the conduit members to each other, said inner wall and sidewall including stepped portions defining at least one additional pair of clamping walls axially spaced from said first clamping walls, the axial spacing of said second clamping walls being greater than the axial spacing of the first clamping walls whereby only upon removal of the first clamping walls the second clamping walls move into clamping engagement upon closure of the clamp unit to maintain firm, physical connection between the conduit members.

2. A coupling assembly combination of claim 1 wherein said coupling unit includes a plurality of coupling members interconnected to define a cylindrical enclosure in the closed position for encircling the adjacent ends of a pair of conduit members, said sections including at least one hinged joint and a releasable latch means interconnected to a pair of the coupling members and having an interconnected handle movable between open and closed positions.

3. In the combination of claim 1, wherein said coupling unit has a cup-shaped cross-section defining a frustro-conically shaped cavity with a flat base portion and a pair of oppositely inclined spaced sidewalls, the outer ends of said legs terminating in generally planar walls which, in a closed position, define a circle slightly greater than the diameter of the base of said groove, said inclined walls including a stepped portion immediately adjacent the outer periphery thereof to define said first clamping wall immediately adjacent the inner periphery of the coupling unit and said second clamping wall spaced radially and axially from said first clamping wall.

4. The coupling assembly of claim 1 wherein said coupling unit defines a cavity overlying the ends of conduit members and including an encircling gasket member located within said cavity and including a base ring portion with a centrally located inner projecting member located between the opposing ends of said pipe ends, said sealing gasket having a pair of annular recesses located one each immediately adjacent to the opposite sides of said projecting member, each recess having an axially outer inclined sidewall defining a sealing lip engaging the pipe end.

5. In the combination of claim 4 wherein the ends of the conduit members have chamfered peripheries, said gasket having inner walls inclined and spaced to locate the sealing lip in engagement with said chamfered periphery with the projecting member abutting the end face of the conduit member.

6. In the combination of claim 4 wherein said recesses having the outer sidewalls spaced from the projecting member generally in accordance with the width of the projecting member.

7. In the combination of claim 1 wherein said coupling unit includes a pair of semi-circular coupling members arranged to define a circular enclosure, a hinge means connected to one adjacent end of said members permitting relative, pivotal movement between an open expanded position for insertion and removal of the conduit means and a closed circular position, a releasable latch means interconnected to the ends of said members and having an interconnected operating handle, each of said coupling members including a generally, cup-shaped, cross-section defining a frustroconically shaped cavity with a flat base portion connected to said pair of legs, the outer ends of said legs terminating in generally planar peripheral walls which, in a closed position, define a diameter slightly greater than the diameter of the base of said groove, said legs having inclined walls including an intermediate stepped portion defining said first clamping wall immediately adjacent the peripheral wall of the coupling member and a radially and axially spaced second clamping wall spaced from said first clamping wall.

8. The coupling assembly of claim 7 including an encircling gasket member located within said frustroconical cavity and including a base ring portion substantially conforming to said cavity with a centrally located inner projecting sealing ridge located between the opposing ends of said conduit members, said sealing gasket having annular recesses immediately adjacent the ridge with the axially outer sidewall of each recess inclined to define a sealing lip engaging the conduit.

9. In the combination of claim 8 wherein the ends of the conduit members are chamfered peripheries, said gasket having inner walls inclined and spaced to locate the sealing lip in engagement with said chamfered periphery with the projecting member abutting the end face of the conduit member.

10. In the combination of claim 9 wherein said recesses having the outer sidewalls spaced from the projecting member generally in accordance with the width of the projecting member.

* * * * *